(12) United States Patent
Jeon (10) Patent No.: US 7,566,146 B2
(45) Date of Patent: Jul. 28, 2009

(54) BACKLIGHT UNIT INCLUDING A FIRST REFLECTOR AND A SECOND REFLECTOR AND LIQUID CRYSTAL DISPLAY USING THE SAME

(75) Inventor: Seong Man Jeon, Seoul (KR)

(73) Assignee: LG Display Co., Ltd., Seoul (KR)

( * ) Notice: Subject to any disclaimer, the term of this patent is extended or adjusted under 35 U.S.C. 154(b) by 237 days.

(21) Appl. No.: 11/451,480

(22) Filed: Jun. 13, 2006

(65) Prior Publication Data

US 2006/0285326 A1 Dec. 21, 2006

(30) Foreign Application Priority Data

Jun. 15, 2005 (KR) .................... 10-2005-0051649

(51) Int. Cl.
*F21V 7/05* (2006.01)
*G09F 13/08* (2006.01)

(52) U.S. Cl. .................... 362/247; 362/97; 362/296.05; 362/304; 362/349

(58) Field of Classification Search ................ 362/240, 362/241, 245, 247, 97.2, 97.3, 296.05, 296.09, 362/297, 304, 311.11, 349
See application file for complete search history.

(56) References Cited

U.S. PATENT DOCUMENTS

| 4,631,642 | A | * | 12/1986 | Brun | 362/581 |
| 6,007,209 | A | * | 12/1999 | Pelka | 362/30 |
| 6,193,392 | B1 | * | 2/2001 | Lodhie | 362/235 |
| 6,491,411 | B2 | * | 12/2002 | Itoh | 362/246 |
| 6,814,475 | B2 | * | 11/2004 | Amano | 362/487 |
| 6,857,759 | B2 | * | 2/2005 | Lee et al. | 362/225 |
| 6,871,982 | B2 | * | 3/2005 | Holman et al. | 362/331 |
| 7,217,004 | B2 | * | 5/2007 | Park et al. | 362/240 |
| 2004/0125262 | A1 | | 7/2004 | Cho et al. | |

FOREIGN PATENT DOCUMENTS

| JP | 2002303882 | 10/2002 |
| JP | 2005-100837 | 4/2005 |

\* cited by examiner

Primary Examiner—Alan Cariaso
(74) Attorney, Agent, or Firm—Holland & Knight LLP (57) ABSTRACT

A backlight unit includes a case; a first reflector on a surface of the case; a light source disposed on the first reflector; and a second reflector having a first reflective portion and a second reflective portion along first and second sides of the case.

21 Claims, 7 Drawing Sheets

BACKLIGHT UNIT INCLUDING A FIRST REFLECTOR AND A SECOND REFLECTOR AND LIQUID CRYSTAL DISPLAY USING THE SAME

This application claims the benefit of the Korean Patent Application No. P2005-0051649 filed on Jun. 15, 2005 which is hereby incorporated by reference in its entirety.

BACKGROUND OF THE INVENTION

1. Field of the Invention

The present invention relates to a backlight unit, and more particularly to a backlight unit and a liquid crystal display using the same. Although the present invention is suitable for a wide scope of applications, it is particularly suitable for increasing display quality.

2. Description of the Related Art

In general, the application scope of a liquid crystal display (LCD) device has been broadening due to it characteristics of light weight, thin profile, and low power consumption. For example, LCD devices are now used in office automation equipment, televisions, computer monitors, cellular phones and other types of audio/video equipment. A LCD device is not a self luminous display device. Thus, an LCD requires an external light source, such as a backlight. An active matrix type LCD devices uses thin film transistors (TFTs) as switching elements. The active matrix type LCD device controls a transmitted amount of light from the backlight in accordance with a signal applied to the TFTs, thereby displaying a desired picture on a screen.

The backlight for the LCD device can either be a direct type or an edge type. The edge type backlight has a light source installed at the edge of one side of an LCD panel, and irradiates an incident light from the light source to the entire surface of an LCD panel using a transparent light guide panel. The direct type backlight has a plurality of light sources disposed directly under the LCD panel, and irradiates a uniform planar white light to the liquid crystal display panel.

The backlight includes a light source, such as cold cathode fluorescent lamps (CCFLs), external electrode fluorescent lamps (EEFLs), and/or light emitting diodes (LEDs). Among the CCFLs, EEFLs and LEDs light sources, LEDs have the characteristics of small size, low power consumption and stability. Accordingly, LEDs are becoming widely used as light sources in backlights for LCD devices.

Figure 1:
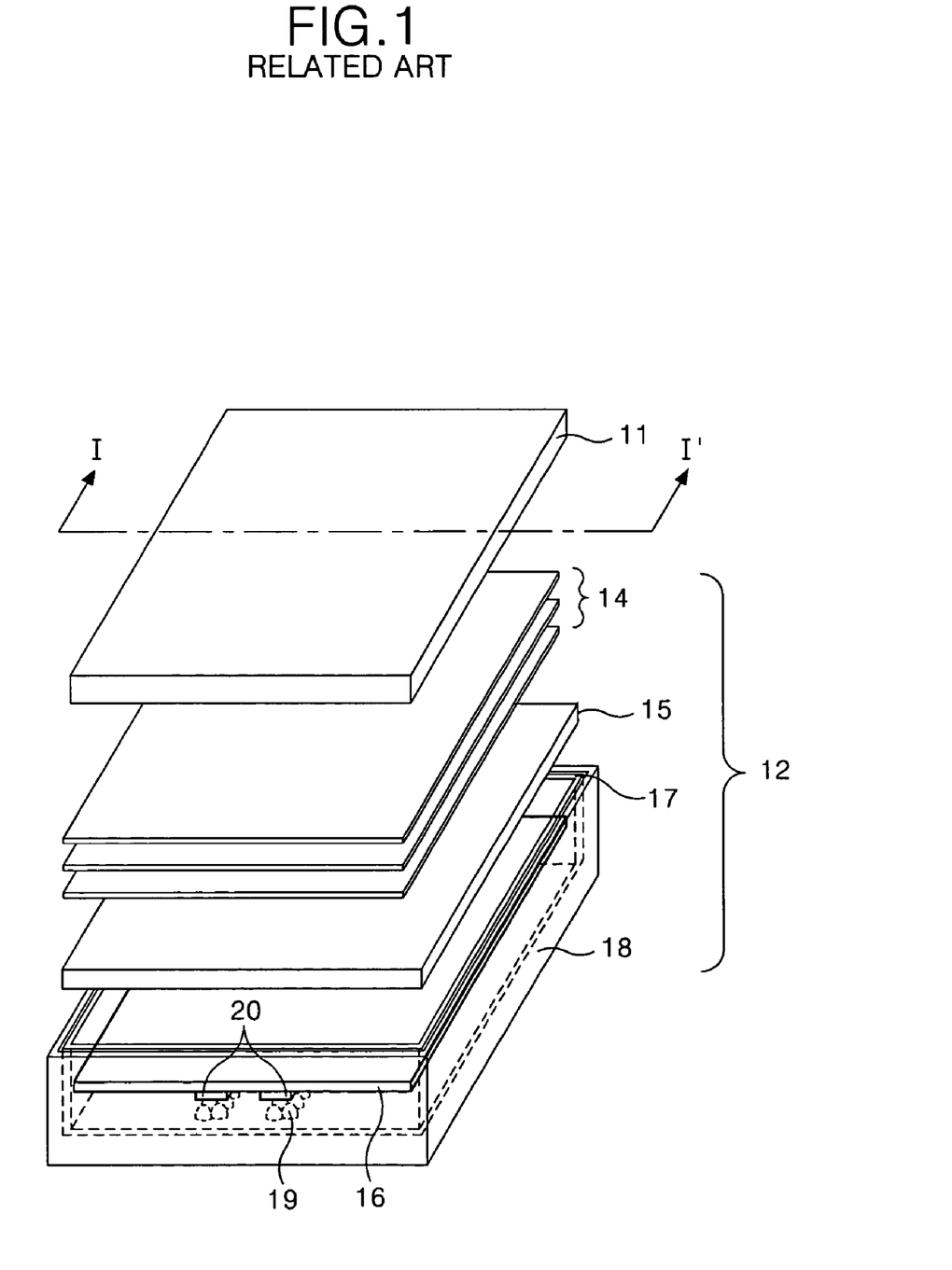
FIG. 1 is an exploded perspective view of a liquid crystal display device according to the related art.
Figure 2:
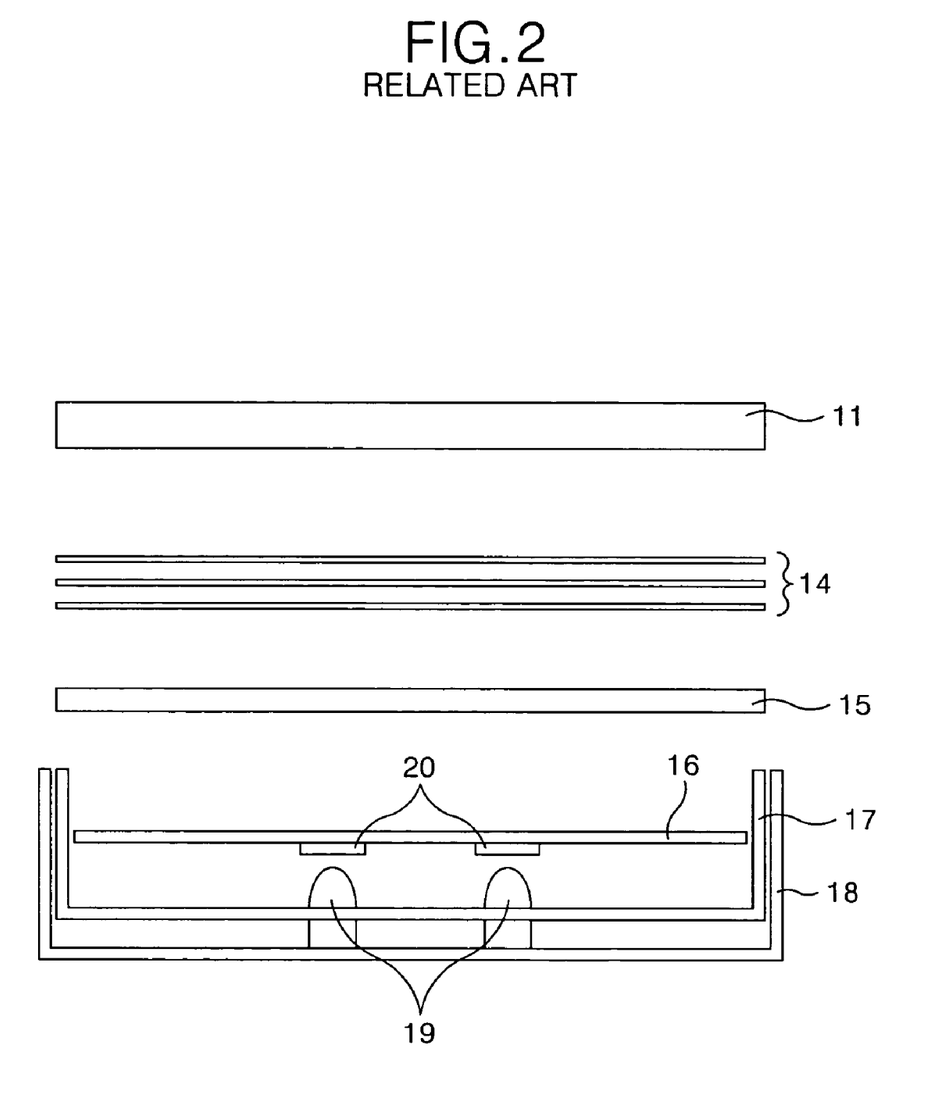
FIG. 2 is a cross-sectional view along the line I-I' in FIG. 1.

FIG. 1 is an exploded perspective view of a liquid crystal display device according to the related art, and FIG. 2 is a cross-sectional view along the line I-I' in FIG. 1. FIGS. 1 and 2 are diagrams of small to medium sized LCD devices. Small and medium sized LCD devices have sizes in the range of about 10"~30". As shown in FIGS. 1 and 2, an LCD device of the related art includes a liquid crystal display panel 11 for displaying a picture; and a backlight unit 12 for irradiating uniform planar light into the liquid crystal display panel 11. The liquid crystal display panel 11 displays a picture by electrically controlling liquid crystal molecules to modulate light incident from the backlight unit 12.

The backlight unit 12 includes a case 18; a reflector 17 provided within the case 18; a plurality of LEDs 19 positioned in the reflector 17; a diffusion plate 15 covering the plurality of LEDs 19 and the reflector 17; a light guide panel 16 disposed between the diffusion plate 15 and the reflector 17; reflectors 20 on the light guide panel 16; and optical sheets 14 covering the diffusion plate 15. The case 18 can be a rectangular container shape having an opening and an inner space. The reflector 17 is along side surfaces and a bottom surface of the case 18 within the inner space of the case 18. The LEDs 19 are arranged in two rows in the inner space at a central area of the case 18 and protrude through the reflector 17. The reflector 17 is disposed under the LEDs 19 in the inner space of the case 18 so as to reflect the light generated from the LEDs 19, thereby increasing the efficiency of light emission to the liquid crystal display panel 11. A light guide panel 16 is positioned within the inner space of the case 18 over the LEDs 19. Reflectors 20 are attached to the light guide panel 16 directly over the LEDs 19. The opening of the case 18 is covered by a diffusion plate 15. Light from the LEDs 19 is mixed within a portion of the inner space between the case 18, the diffusion plate 15 and the light guide panel 16.

The LEDs 19 include blue LEDs generating blue light, green LEDs generating green light, and red LEDs generating red light. The LEDs are arranged in a sequence of blue LED, green LED and then red LED in each of the rows. In the alternative, the LEDs are arranged in a sequence of green LED, blue LED and then red LED in each row.

The light guide panel 16 supports the reflector 20 and is disposed between the diffusion plate 15 and the LEDs 19 within the inner spacer of the case 18. The reflectors 20 are known as "diverters" and are attached to a rear surface of the light guide panel 16 facing the LEDs 19. The reflectors 20 respectively correspond to the LEDs 19 and divert (or reflect) light vertically emitted from the LEDs toward the reflector row 17.

The red, green and blue lights generated by the LEDs 19 are reflected by the reflector 17 and the reflectors 20 attached to the light guide panel 16 into the inner space of the case 18 and are mixed into a white light within the inner space of the case 18. The diffusion plate 15 covers the opening of the case 18, and diff-uses the white light mixed within the inner space of the case 18, thereby providing uniform white light to the liquid crystal display panel 11. The optical sheets 14 also diffuse the light from the diffusion plate 15 and control the emission direction of the uniform white light.

The liquid crystal display device of the related art has a problem in that the light guide panel 16 sags due to heat generated in the inner space of the case 18 from the LEDs 19. The light guide panel 16 sags such that the reflectors 20 are not directly over the LEDs. Thus, vertical light emitted directly from the LEDs 19 is not reflected by the reflectors 20 on the light guide panel 20, but rather is incident directly onto the light guide panel 16. If vertical light emitted directly from the LEDs 19 through the diffusion plate 15 and to the optical sheets 14 is incident onto the light guide panel 20, the incident light to the liquid crystal display panel 11 has spots of red, green and/or blue tones such that color reproduction capability of the liquid crystal display panel 11 is decreased.

SUMMARY OF THE INVENTION

Accordingly, the present invention is directed to a backlight unit and a liquid crystal display using the same that substantially obviate one or more of the problems due to limitations and disadvantages of the related art.

An object of the present invention to provide a liquid crystal display device with uniform white light.

Another object of the present invention to provide a liquid crystal display device having increased display quality.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a backlight unit includes a case; a first reflector on a surface of the case; a light source disposed on the first reflector; and a second reflector having a first reflective portion and a second reflective portion along first and second sides of the case.

In another aspect, a backlight unit includes a case; a first reflector on a surface of the case; at least one row of light emitting diodes disposed on the first reflector; and a second reflector having a first reflective portion and a second reflective portion along first and second sides of the case, each of the first and second reflective portions extending to a first height above the first reflector, a first distance between the first and second reflective portions is greater than the first height.

In another aspect, a liquid crystal display device includes a backlight unit including a case, a first reflector on a surface of the case, a light source disposed on the first reflector, a second reflector having a first reflective portion and a second reflective portion along first and second sides of the case, and a diffusion plate disposed over the light source and the second reflector; and a liquid crystal display panel disposed over the diffusion plate for displaying a picture using light emitted from the backlight unit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in FIGS. 3 to 6.

Figure 3:
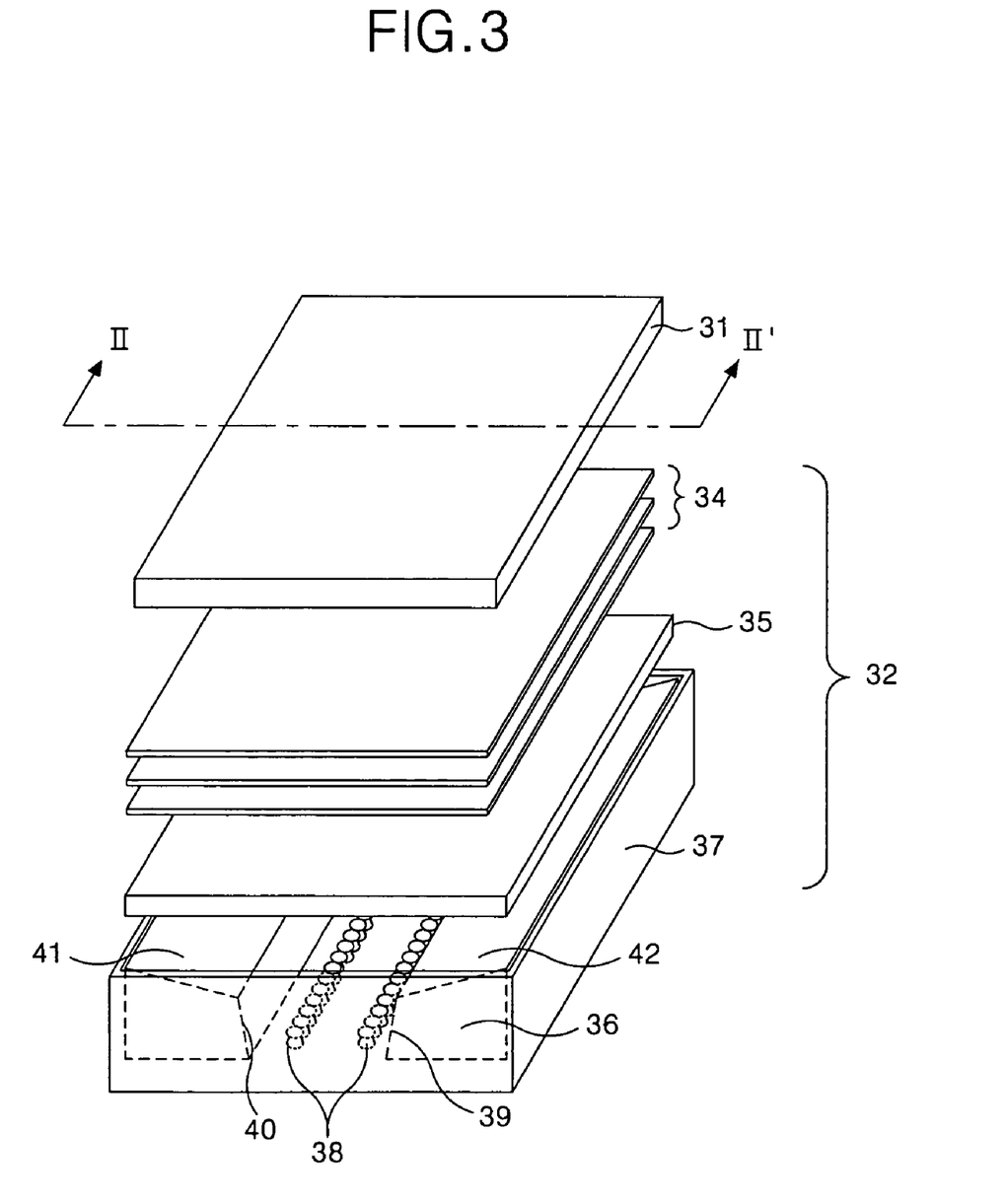
FIG. 3 is an exploded perspective view of a liquid crystal display device according to a first embodiment of the present invention.
Figure 4:
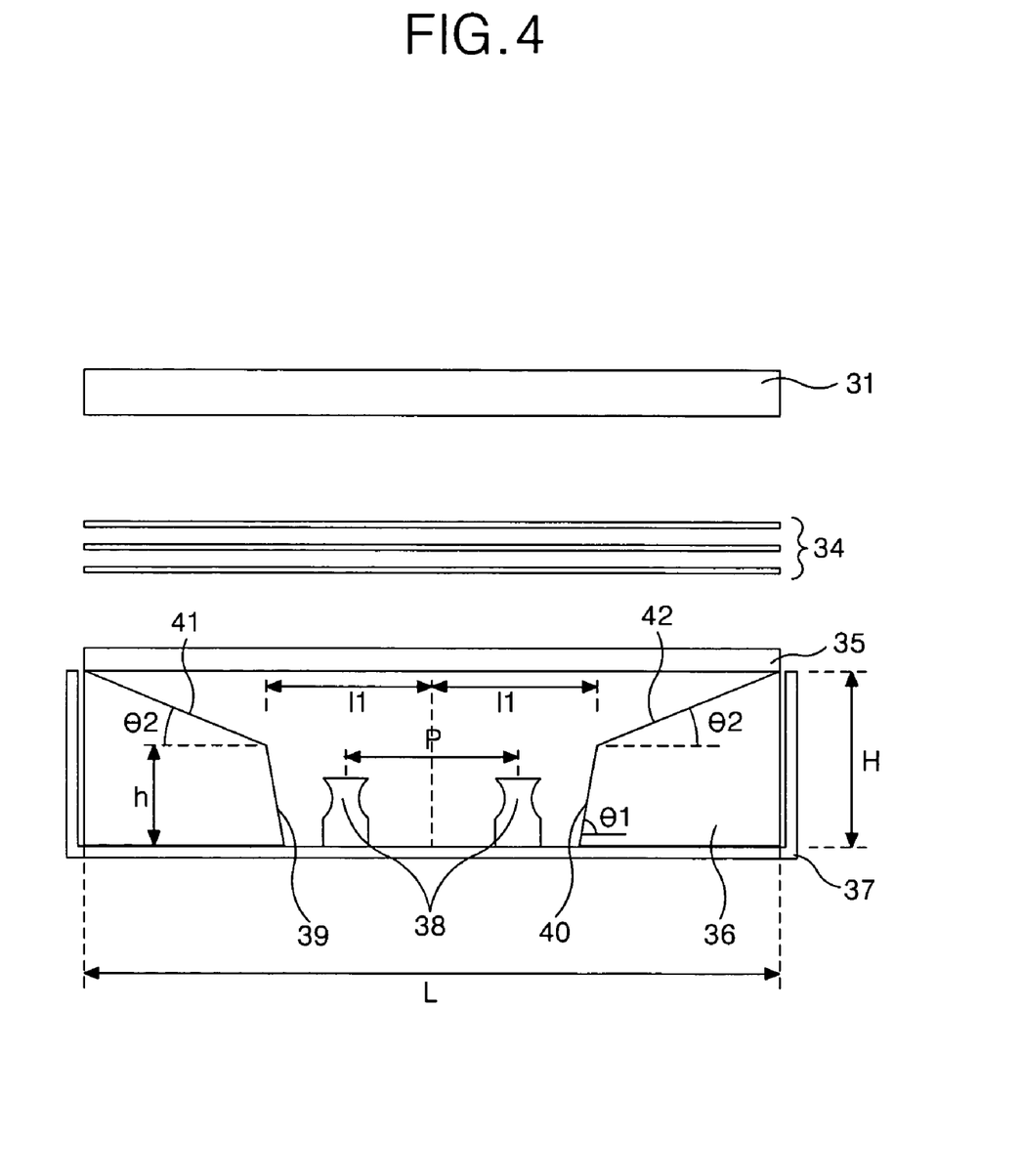
FIG. 4 is a cross-sectional view along the line II-II' in FIG. 3.

FIG. 3 is an exploded perspective view of a liquid crystal display device according to a first embodiment of the present invention, and FIG. 4 is a cross-sectional view along the line II-II' in FIG. 3. As shown in FIGS. 3 and 4, a liquid crystal display device according to a first embodiment of the present invention includes a liquid crystal display panel 31 for displaying a picture and a backlight unit 32 for irradiating a uniform light to the liquid crystal display panel 31. The liquid crystal display panel 31 has liquid crystal cells (not shown) arranged in an active matrix shape between upper and lower substrates (not shown), a liquid crystal layer (not shown), and pixel electrodes (not shown) and a common electrode (not shown) applying an electric field across the liquid crystal layer in each of the liquid crystal cells. The pixel electrodes are connected to thin film transistors (not shown), which are used as a switching devices. The pixel electrodes drive the liquid crystal cells together with the common electrode in accordance with data signals supplied through the thin film transistors, thereby displaying a picture corresponding to the data signals.

The fabrication of the liquid crystal display panel 31 can be divided into a substrate cleaning process, a substrate patterning process, an alignment film forming/rubbing process, a substrate bonding/liquid crystal injecting process, a mounting process, inspection process, a repair process and an assembly process. In the substrate cleaning process, impurities contaminating the surface of the substrate are removed with a cleaning solution. The substrate patterning process is sub-divided into patterning of an upper substrate (color filter substrate) and patterning of a lower substrate (TFT array substrate). In the patterning of the upper substrate, a color filter, a common electrode and a black matrix, etc., are formed. In the patterning of the lower substrate, crossing signal wire lines, such as data lines and gate lines, are formed, TFTs are formed adjacent to the crossings of the of the crossing signal wire lines, and pixel electrodes are formed in pixel areas between the crossing signal wire lines. The pixel electrodes are connected to source electrodes of the TFTs.

In the alignment film forming/rubbing process, alignment films are spread on the upper and lower substrates. Then, the alignment films are rubbed with a rubbing cloth. The alignment films impart an initial alignment direction onto the liquid crystal molecules of the liquid crystal layer prior to the application of the electric field between a pixel electrode and a common electrode.

In the substrate bonding/liquid crystal injecting process, the upper and lower substrates are bonded together by use of a sealant. Liquid crystal and spacers are injected between the upper and lower substrates through a liquid crystal injection hole in the sealant. Then, the liquid crystal injection hole is sealed off.

In the mounting process of the liquid crystal display panel 31, a tape carrier package (hereinafter, referred to as 'TCP') having drive integrated circuits is connected to a pad part on the lower substrate. In the alternative, the drive integrated circuit can be formed directly on the lower substrate by a chip-on-glass COG method. The drive integrated circuits can include a gate drive integrated circuit and a data drive integrated circuit.

The inspection process includes an electrical inspection carried out after forming the signal wire lines and the pixel electrode on the lower substrate. The inspection process also includes another electrical inspection carried out after the substrate bonding/liquid crystal injection process. Further, the inspection process can include a display inspection after assembly of the backlight unit to the LCD panel.

The repair process restores a substrate determined to be repairable by the inspection process. The assembly process attaches the backlight unit to the LCD panel with a case/sash member. A liquid crystal display module results from the repair process.

The backlight unit 32 includes: a case 37 having an opening and an inner space; a V-block shaped reflector 36 installed within the inner space of the case 37; LEDs 38 disposed in the flat bottom surface of the V-block shaped reflector 36; a diffusion plate 35 covering the opening of the case 37, the LEDs 38 and the reflector 36; and optical sheets 34 on the diffusion plate 35. The case 37 is shaped as a container such that the V-block shaped reflector 36 and the LEDs 38 are disposed within the container shape. The edge of the diffusion plate 35 is affixed to the edge of the case 37 adjacent to the opening.

The V-block shaped reflector 36 reflects light from the LEDs 38 to the diffusion plate 35. The V-block shaped reflector 36 includes: a flat bottom surface at which the LEDs 38 are disposed; first and second side walls 39 and 40 having a designated height (h) with a first designated gradient angle θ1 at opposite sides of the flat bottom surface; third and fourth side walls 41 and 42 extending symmetrically from the first and second side walls 39 and 40 with a second designated gradient angle θ2 to an overall height (H), which is about 30~40 mm, preferably about 20~50 mm. In such a V-block shaped reflector 36, the gradient angles and heights of the side walls 39 to 42 should be optimized so that the light from the LEDs 38 can be directed toward the diffusion plate 35 after being sufficiently mixed within the inner space between the side walls 39 to 42. To this end, a distance (2×l1) between the first side wall 39 and the second side wall 40 can be about 80~120 mm. A second gradient angle θ2 for the third and fourth side walls 39 and 40 is determined as arctan (ΔH/ΔL), where ΔH=H−h, ΔL=(L−2.l1)/2, h represents the height of each of the first and second side walls 39 and 40 and L represents the length L of the V-block shaped reflector 36. The V-block shaped reflector 36 is made of a highly flexible and light material, such as aluminum or plastic.

The red, green and blue lights exiting from the LEDs 38 are reflected and mixed between the first side wall 39 and the second side wall 40 so as to be changed into white light, and then the white light is directed toward the diffusion plate 35 or is reflected by the third and fourth side walls 41 and 42 after being reflected from the diffusion plate 35 so as to be incident onto the diffusion plate 35 again. The LEDs 38 include: a blue LED for generating a blue light; a green LED for generating a green light; and a red LED for generating a red light, and are arranged in two LED rows on the flat bottom surface between the first and second side walls 39 and 40 of the V-block shaped reflector 36. The LEDs 38 are arranged in the sequence of blue LED, green LED and then red LED in each LED row, or in the sequence of green LED, blue LED and then red LED in each LED row. A pitch between rows of the LEDs 38 on opposite sides of the case 37 is about 40-80 mm.

Each of the LEDs 38 injects minority carriers (electron or hole) using a semiconductor p-n junction structure and emits light by the re-combination of the minority carriers. A material suitable for the light emitting diode is a compound semiconductor, such as gallium arsenide GaAs, gallium phosphide GaP, gallium-arsenic-phosphorus $GaAs_{1-x}P_x$, gallium-aluminum-arsenic $Ga_{1-x}Al_xAs$, indium phosphide InP, indium-gallium-phosphorus $In_{1-x}Ga_xP$, etc where a light emitting wavelength is in a visible or near-infrared spectrum and light emission efficiency is high through the use of p-n type junction.

The LEDs 38 are side emitter type LEDs having the shape of gourd in which the transparent resin cap on top of the LED is concavely cut at the sides, as shown in FIGS. 3 and 4. The side emitter type LED emits 95% of its light through its side surfaces and 5% of its light through its top surface. The side emitter type LED emits light toward the sidewall 39 to 42 such that the light can be sufficiently mixed between the side walls 39 to 42. In the alternative, the LEDs can be dome type LEDs, in which a transparent dome-shaped gap resin is formed at the top of the LEDs, as in FIGS. 1 and 2, but the light mixing efficiency is less.

The diffusion plate 35 diff-uses the light from the V-block shaped reflector 36, thereby increasing the uniformity of white light provided to the whole surface of the liquid crystal display panel 34. The optical sheets 34 includes: at least one diffusion sheet for diffusing the light; and at least one prism sheet for redirecting the light toward the display surface of the liquid crystal display panel. The optical sheets 34 are positioned above the diffusion plate 35.

Figure 5:
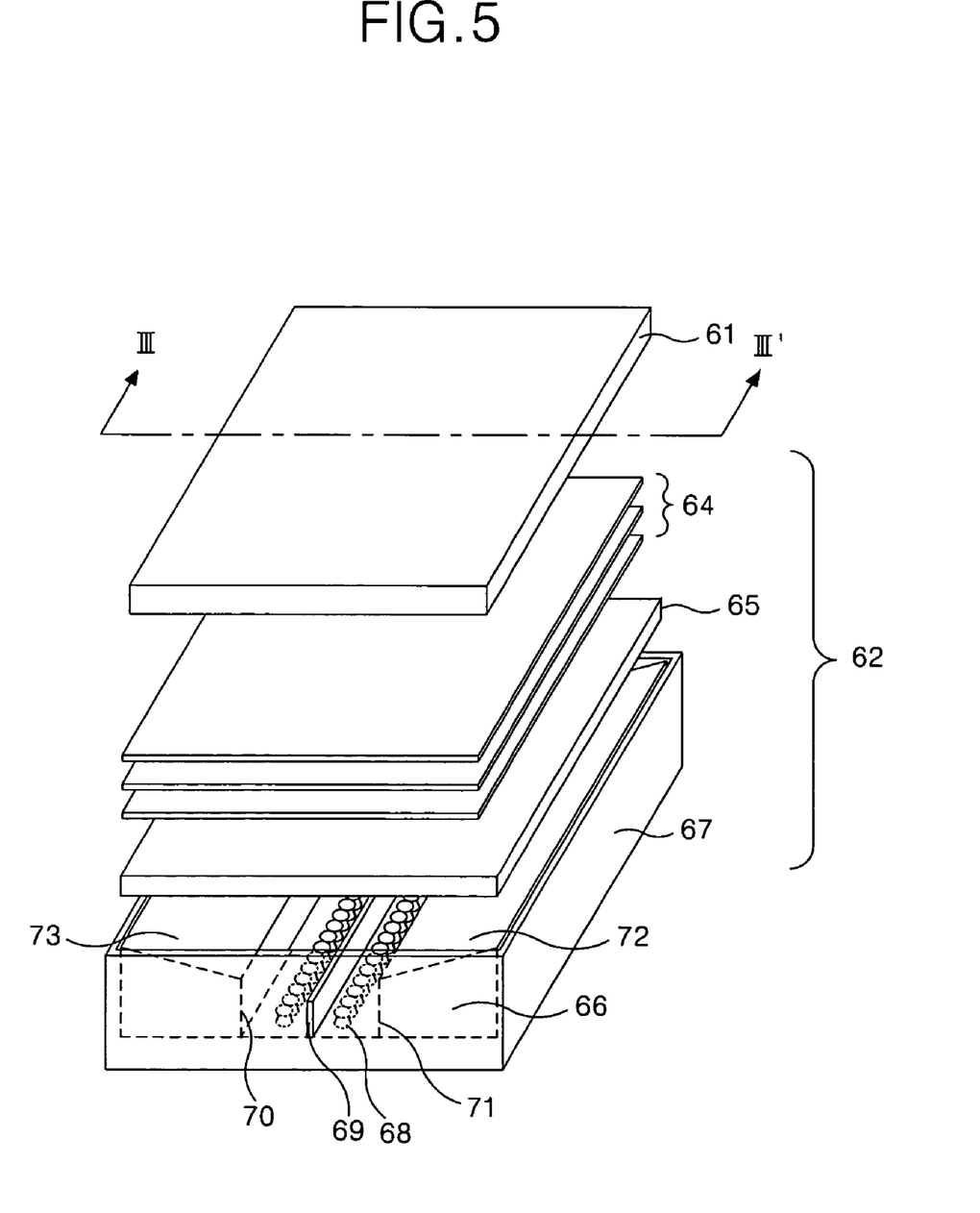
FIG. 5 is an exploded perspective view of a liquid crystal display device according to a second embodiment of the present invention.
Figure 6:
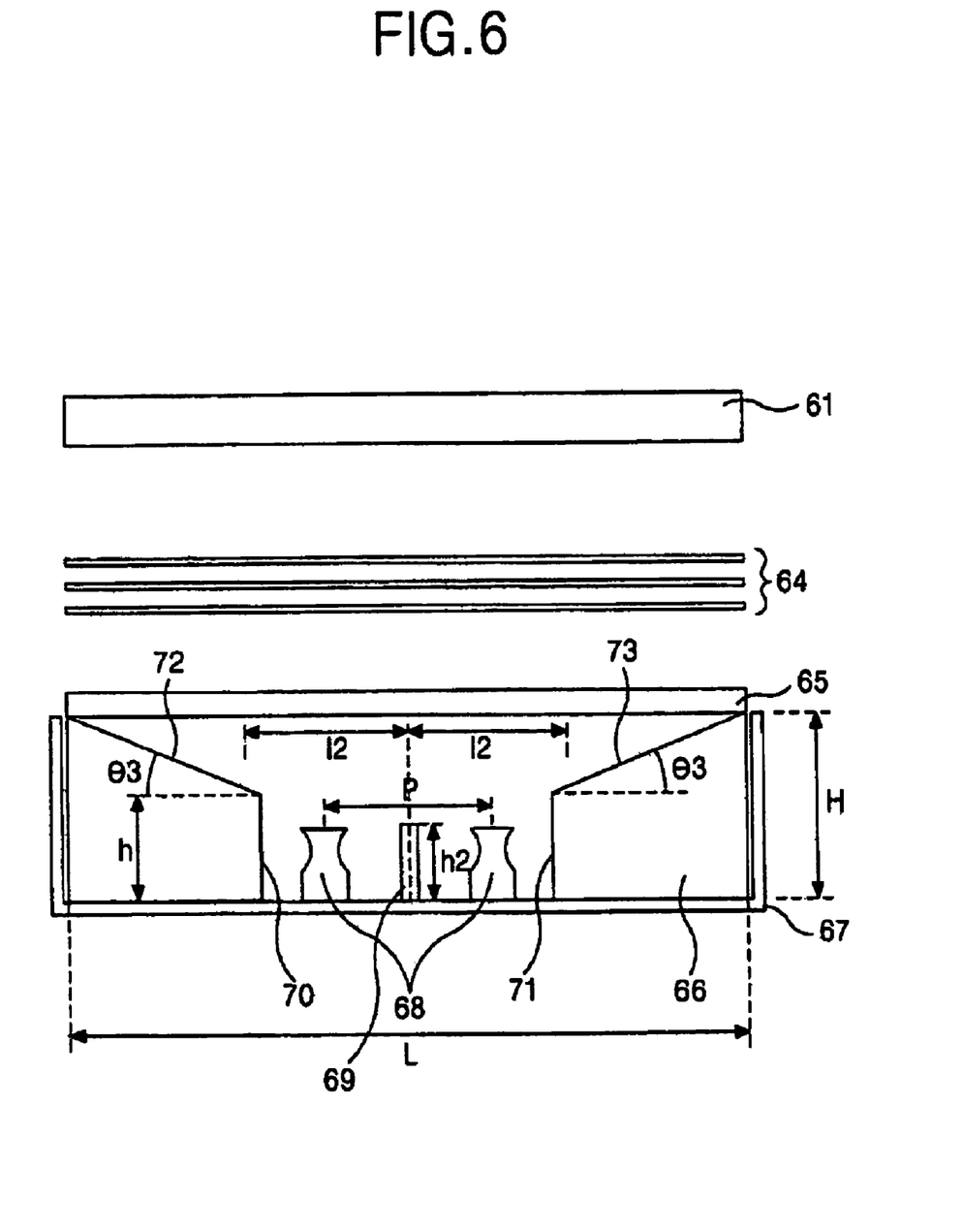
FIG. 6 is a cross-sectional view along the line III-III' in FIG. 5.

FIG. 5 is an exploded perspective view of a liquid crystal display device according to a second embodiment of the present invention, and FIG. 6 is a cross-sectional view along the line III-III' in FIG. 5. As shown in FIGS. 5 and 6, the liquid crystal display device includes a liquid crystal display panel 61 for displaying a picture; and a backlight unit for irradiating a uniform light to the liquid crystal display panel 61. The liquid crystal display panel 61 is substantially the same as the liquid crystal display panel 31 in the foregoing embodiment, therefore a detailed description of the liquid crystal display panel 61 will be omitted.

The backlight unit includes: a case 67 having an opening and an inner space; a V-block shaped reflector 66 installed within the inner space of the case 37; a double-sided auxiliary reflector 69 formed down the middle part of the V-block shaped reflector 66; LEDs 68 formed at the flat bottom surface within the V-block shaped reflector 66 on both sides of the double-sided auxiliary reflector 69; a diffusion plate 65 disposed on the case 37; and optical sheets 64 disposed on the diffusion plate 65. The V-block type reflector 66 is installed within the inner space of the case 67. The LEDs 68 are arranged in two rows on both sides of the double-sided auxiliary reflector 69 protruding through the V-block type reflector 66. The edge of the diffusion plate 65 is affixed to the edge of the case 67 adjacent to the opening The V-block shaped reflector 66 reflects the light from the LEDs 68 to the diffusion plate 65. The V-block shaped reflector 66 includes: a flat bottom surface where the LEDs 68 are disposed; first and second side walls 70 and 71 perpendicular to the flat bottom surface of the reflector having a designated height (h1) and on opposite sides of the bottom surface; third and fourth side walls 72 and 73 extending symmetrically from the first and second side walls 70 and 71 with a designated gradient angle θ3 to an overall height (H); and a double-sided auxiliary reflector 69 disposed in the middle part of the bottom surface of the reflector 66 and having designated height (h2). In such a V-block shaped reflector 66, the height (H) of the side walls 70 to 73, the height (h2) of the double-sided auxiliary reflector 69, and the gradient angle θ3 of the third and fourth side walls 72 and 73 should be optimized so that the light from the LEDs 68 can be directed toward the diffusion plate 65 after being sufficiently mixed within the inner space between the side walls 70 to 73. To this end, the height H is about 30~40 mm, preferably 20~50 mm, a height (h2) of the double-sided auxiliary reflector 69 is set to not more than about 20 mm, a distance (l2) between the first or second side wall 70 and 71 and the double-sided auxiliary plate 69 is about 40~60 mm. The gradient angle θ3 can be set in proportion to the distance between the first or second side wall 70 and 71 and the double-sided auxiliary reflector 69. The gradient angle θ3 can be obtained as arctan (ΔH/ΔL), where ΔH=H−h1, ΔL=(L−2.l2)/2, h1 represents the height of the first side wall 70 and second side wall 71 and L represents the length L of the V-block shaped reflector 66. The V-block shaped reflector 36 is made of a highly flexible and light material, such as aluminum or plastic.

As a result, the blue, green and red lights generated in the LEDs 68 are reflected to be mixed between the first side wall 70 and the second side wall 71 so as to be changed into white light, and then the color-mixed white light is provided to the diffusion plate 65 or is reflected by the third and fourth side walls 72 and 73 after being reflected from the diffusion plate 65 so as to be incident to the diffusion plate 65 again in accordance with the incidence angle for the diffusion plate 65. A pitch between rows of the LEDs 68 on opposite sides of the case 37 is about 40-80 mm. The LEDs 68, the diffusion plate 65 and the optical sheets 64 are substantially the same as the foregoing embodiment, thus a detail explanation for these elements will be omitted.

Figure 7:
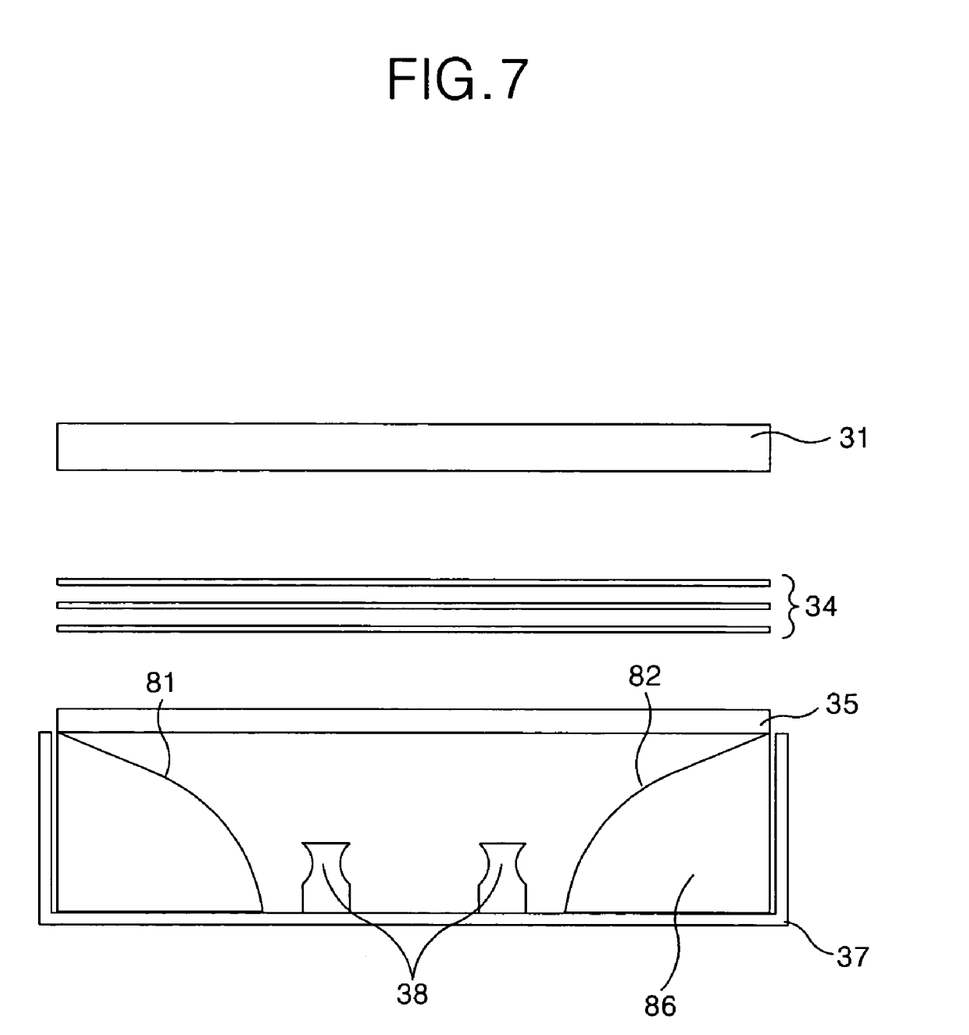
FIG. 7 is a cross-sectional view of a liquid crystal display device according to a third embodiment of the present invention.

FIG. 7 is a cross-sectional view of a liquid crystal display device according to a third embodiment of the present invention. Referring to FIG. 7, the backlight unit 32 includes: a case 37 having an opening and an inner space; a V-block shaped reflector 86 installed within the inner space of the case 37; LEDs 38 disposed in the flat bottom surface of the V-block shaped reflector 86; a diffusion plate 35 covering the opening of the case 37, the LEDs 38 and the reflector 86; and optical sheets 34 on the diffusion plate 35. The case 37 is shaped as a container such that the V-block shaped reflector 86 and the LEDs 38 are disposed within the container shape. The edge of the diffusion plate 35 is affixed to the edge of the case 37 adjacent to the opening.

The V-block shaped reflector 86 reflects light from the LEDs 38 to the diffusion plate 35. The V-block shaped reflector 86 includes: a flat bottom surface at which the LEDs 38 are disposed; first and second curved side walls 81 and 82 extending from the flat bottom surface to the edges of the diffusion plate 35. For example, the surface of each of the first and second curved side walls 81 and 82 can have a logarithmic shape. The first and second side walls 81 and 82 can be symmetrical with respect to a center of the case 37. The V-block shaped reflector 86 is made of a highly flexible and light material, such as aluminum or plastic.

Accordingly, a small to medium sized backlight unit according to the present invention does not include a separate light guide panel through the use of a V-block shaped reflector, thus it is possible to prevent the light guide panel from sagging and to prevent color spots. Further, the LCD device according to the present invention can increase the display quality use the backlight unit in the embodiments of the present invention.

It will be apparent to those skilled in the art that various modifications and variations can be made in the backlight unit and a liquid crystal display using the same of the present invention without departing from the spirit or scope of the invention. Thus, it is intended that the present invention cover the modifications and variations of this invention provided they come within the scope of the appended claims and their equivalents.

What is claimed is
1. A backlight unit, comprising:
a case having an opening and an inner space;
a reflector installed within the inner space of the case and having a first reflective portion and a second reflective portion; and
a light source disposed on the first reflective portion of the reflector;
wherein the first reflective portion is a flat bottom surface,
wherein the second reflective portion of the reflector is provided along first and second sides of the case, and
wherein the second reflective portion of the reflector includes:
a first side wall and a second side wall on opposite sides of the case having a first gradient angle with respect to the first reflective portion of the reflector, wherein the first and second side walls are perpendicular to the first reflective portion and on opposite sides of the case; and
a third side wall and a fourth side wall respectively extending from the first and second side walls and extending symmetrically from an end of the first and second side walls at a second gradient angle with respect to the first reflective portion of the reflector.

2. The backlight unit of claim 1, further comprising a diffusion plate disposed over the light source and the reflector.

3. The backlight unit of claim 2, wherein the first reflective portion of the reflector and the second reflective portion of the reflector mix light emitted from the light source toward the diffusion plate.

4. The backlight unit of claim 2, wherein the first gradient angle is larger than the second gradient angle.

5. The backlight unit of claim 1, wherein each of the first and second side walls has a curved surface.

6. The backlight unit of claim 5, wherein the curved surface includes a logarithmic shape.

7. The backlight unit according to claim 1, wherein the light source includes side emitting type light emitting diodes.

8. The backlight unit according to claim 1, wherein the light source includes a red, a green and a blue light emitting diodes in a row.

9. The backlight unit according to claim 1, wherein the light source includes side emitting type light emitting diodes.

10. The backlight unit according to claim 1, wherein the light source includes a red, a green, and a blue light emitting diodes in a row.

11. The backlight unit according to claim 1, further comprising a double-sided reflector at a middle part of the case.

12. The backlight unit of claim 11, wherein the double-sided reflector includes a third reflector.

13. The backlight unit according to claim 11, wherein the light source includes at least a first row of light emitting diodes on a first side of the double-sided reflector and at least a second row of light emitting diodes on a second side of the double-sided reflector.

14. The backlight unit according to claim 11, wherein a first height of the first and second side walls from the first reflective portion of the reflector is greater than a second height of the double-sided reflector above the first reflective portion of the reflector.

15. A backlight unit, comprising:
a case having an opening and an inner space;
a reflector installed within the inner space of the case and having a first reflective portion and a second reflective portion; and
at least one row of light emitting diodes disposed on the first reflective portion of the reflector;
wherein the first reflective portion is a flat bottom surface,
wherein the second reflective portion of the reflector is provided along first and second sides of the case, and
wherein the second reflective portion of the reflector includes:
a first side wall and a second side wall extending to a first height above the first reflective portion of the reflector on opposite sides of the case and having a first gradient angle with respect to the first reflective portion of the reflector, a first distance between the first and second side walls is greater than the first height, wherein the first and second side walls are perpendicular to the first reflective portion; and a third side wall and a fourth side wall respectively extending from the first and second side wall and extending symmetrically from the first and second reflective portions at a second gradient angle with respect to the first reflective portion of the reflector.

16. The backlight unit of claim 15, further comprising a diffusion plate disposed over the at least one row of light emitting diodes and the first reflective portion of the reflector.

17. The backlight unit according to claim 15, wherein the at least row of light emitting diodes includes side emitting type light emitting diodes.

18. The backlight unit according to claim 15, further comprising a double-sided reflector at a middle part of the case.

19. The backlight unit according to claim 18, wherein the light emitting diodes include at least a first row of light emitting diodes on a first side of the double-sided reflector and at least a second row of light emitting diodes on a second side of the double-sided reflector.

20. The backlight unit according to claim 18, wherein the first height of the first and second side walls from the first reflective portion of the reflector is greater than a third height of the double-sided reflector above the first reflective portion of the reflector.

21. A liquid crystal display device, comprising:

a backlight unit including a case having an opening and an inner space, a reflector installed within the inner space of the case and having a first reflective portion and a second reflective portion, a light source disposed on the first reflective portion, and a diffusion plate disposed over the light source and the reflector; and a liquid crystal display panel disposed over the diffusion plate for displaying a picture using light emitted from the backlight unit, wherein the first reflective portion is a flat bottom surface, wherein the second reflective portion of the reflector is provided along first and second sides of the case, and wherein the second reflective portion of the reflector includes:

a first side wall and a second side wall extending to a first height above the first reflective portion of the reflector on opposite sides of the case and having a first gradient angle with respect to the first reflective portion of the reflector, a first distance between the first and second side walls is greater than the first height, wherein the first and second side walls are perpendicular to the first reflective portion of the reflector and on opposite sides of the first reflective portion; and a third side wall and a fourth side wall respectively extending from the first and second side wall and extending symmetrically from the first and second reflective portions at a second gradient angle with respect to the first reflective portion of the reflector.

* * * * *